United States Patent [19]

Couture et al.

[11] 4,402,781

[45] Sep. 6, 1983

[54] CONTINUOUS SOLID WOOD LAMINATED PANELS

[76] Inventors: Joachim Couture, R.R. 3, Sayabec, Quebec, Canada, G0J 3K0; Raymond Couture, 1935 Placs Nightingale, St. Bruno, Canada, J3V 4P6

[21] Appl. No.: 363,726

[22] Filed: Mar. 30, 1982

[51] Int. Cl.³ ........................ B32B 31/04; B32B 31/20

[52] U.S. Cl. ................................ 156/274.6; 144/344; 156/274.8; 156/275.5; 156/304.1; 156/304.6; 156/380.3; 156/380.6; 156/558; 156/559; 156/569

[58] Field of Search ............... 156/273.7, 274.4, 274.6, 156/274.8, 275.5, 304.1, 304.6, 379.8, 380.3, 380.6, 502, 556, 558, 559, 569, 583.1; 144/344

[56] References Cited

U.S. PATENT DOCUMENTS

| | | | |
|---|---|---|---|
| 2,401,648 | 6/1946 | Kahr | 156/559 |
| 2,453,185 | 11/1948 | Bilhuber | 156/380.3 |
| 2,537,918 | 1/1951 | Skoog | 156/558 |
| 2,642,835 | 6/1953 | Winkel | 156/559 |
| 2,708,649 | 5/1955 | Cunningham | 156/559 |

*Primary Examiner*—Michael G. Wityshyn

[57] ABSTRACT

An apparatus and a method for making a continuous solid wood-laminated panel from elongated wooden blocks precoated with glue along two right angular edges. An elongated table is provided at its feeding end with a plurality of rack members disposed over the same for holding individual stacks of glue-coated wooden blocks at a feeding station with the blocks all aligned longitudinally of the table and equally offset transversely of the table. A power-actuated ram member is slidable along said table and has a stepped ram edge engageable with the lowermost blocks of each stack and movable transversely and forwardly of the table to push the blocks against the longitudinal and transverse edges of a previously-arranged group of such blocks pressed on the table by a pressing plate, the blocks being pressed between the ram member and an abutment shoulder arranged longitudinally of the table on the opposite side from the ram member, the ram member then accomplishing a longitudinal forward stroke to push the blocks under said plate forwardly longitudinally of the table, reciprocating movement of the ram member causing successive groups of wooden blocks to be assembled and joined together. The apparatus further includes an electrode plate fed with a high-frequency electrical supply means to cure the glue at the joints between successive groups of blocks while pressing the same against the table. The apparatus finally includes a braking plate at the forward end of the table, which retards the forward movement of the panel.

17 Claims, 8 Drawing Figures

Fig. 5
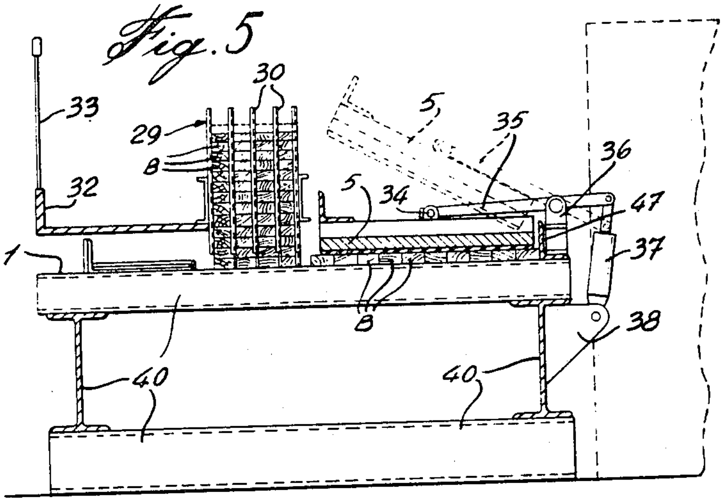
Fig. 7
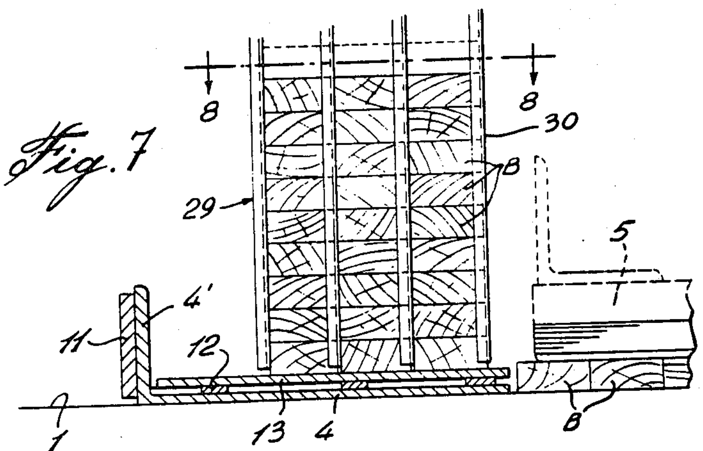
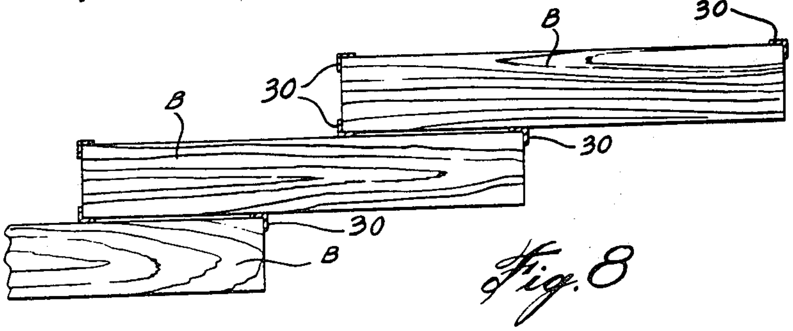
Fig. 8

CONTINUOUS SOLID WOOD LAMINATED PANELS

FIELD OF THE INVENTION

The present invention relates to a method and an pparatus for making solid wood-laminated panels. uch panel consists of a solid wood piece of blocks lued together and arranged in longitudinal rows with he blocks of one row staggered relative to the blocks of djacent rows.

BACKGROUND OF THE INVENTION

Such laminated panels are known but they are curently made in accordance with a predetermined length nd width by a discontinuous process. The individual lue-coated wooden blocks must be manually laid out n the table of a press; ram means press the blocks toether along their edges to form the panel and then the ressing plate of the press is brought against the panel, aid pressing plate being provided with an electrode fed vith high-frequency electricity to produce curing of the lue, normally a thermosetting resin such as urea glue. uch an apparatus and method for producing laminated anels is time consuming and the panels have a predeermined length which is unsuitable for certain applicaions. Such panels are normally used in cabinet work, in onstruction, in decoration and the like; for instance tairway handrails and desk counters are often made rom such laminated panels.

The known apparatus and method have a limited roduction capacity since it is not a continuous operaion and the individual wooden blocks must be arranged nanually for each panel made.

OBJECTS OF THE INVENTION

It is a main object of the present invention to provide n apparatus and a method for producing solid woodaminated panels in a continuous manner with the panel roduced thereby having an undetermined length.

Another object of the invention is the provision of a nethod and apparatus to produce solid wood-laminated anels in a fast and effective manner, in which the longiudinal and transverse joints between the individual vooden pieces have a close and smooth fit.

SUMMARY OF THE INVENTION

The method of the invention is for obtaining a continous laminated panel made of undivided solid wood locks, glued together, arranged in longitudinal rows nd offset transversely of the panel. The method comrises the steps of successively positioning groups of uch blocks glue coated along at least to adjacent edges t a feeding station at the rear end portion of an elonated table, the blocks of each group disposed side by ide in a number equal to the number of said longitudial rows and each aligned longitudinally of said table, he blocks of each group offset one from the other lonitudinally of the table, successively pushing each roup of so positioned blocks along said table transersely and forwardly of said table to abut the blocks of succeeding group against the blocks of a preceding roup, said pushing step being effected on a given group f blocks while the preceding groups of blocks are ositively retained against movement transversely of aid table and while they are braked in their forward novement longitudinally of said table, to press the locks together and form close joints between the blocks, and heat curing the glue of the assembled and pressed blocks.

The apparatus of the invention comprises an elongated table, a ram movable on the table at one end portion of the latter, said ram having a stepped ram edge and guide means to cause said ram to move while remaining parallel to itself transversely and forwardly of the table, said table having a longitudinal abutment shoulder along its edge opposite the ram member, pressing plates to press the assembled blocks against said table while they are being moved step by step by said ram member, one of said pressing plates having means to cure the glue, the apparatus preferably including a braking means at the outlet end of the apparatus to effect an increased braking pressure on the leading end of the assembled panel to increase the longitudinal pressure between the various blocks during the final stage of the forward stroke of the ram member.

BRIEF DESCRIPTION OF THE DRAWINGS

In the annexed drawings:

FIG. 5 is a cross-section taken along line 5—5 of FIG. 1;

FIG. 7 is a cross-sectional view on an enlarged scale corresponding to a portion of FIG. 5; and FIG. 8 is a top partial plan view of the stacking racks taken along line 8—8 of FIG. 7.

DETAILED DESCRIPTION OF THE INVENTION

Figure 1:
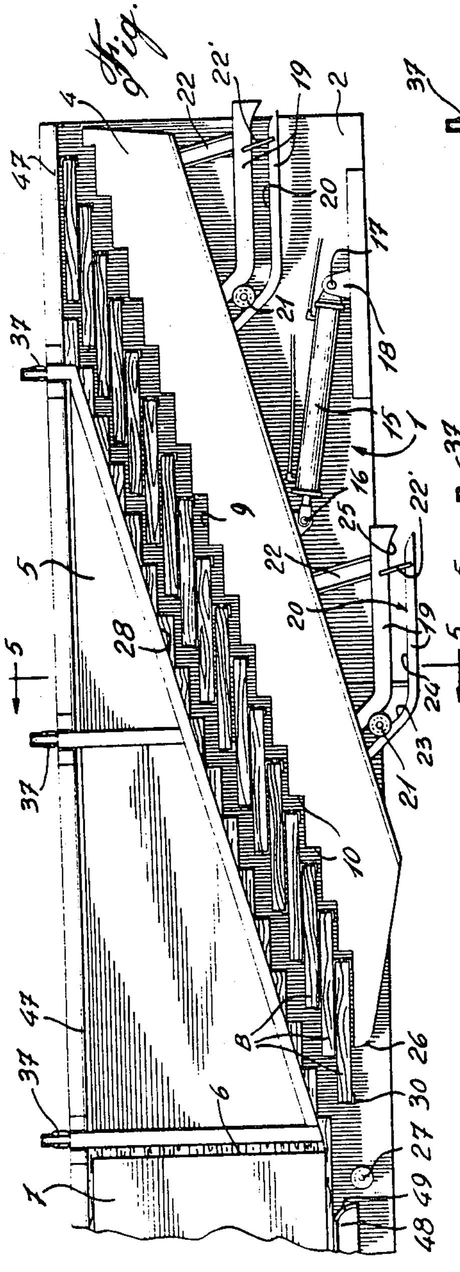
FIG. 1 is a top plan view of the rear portion of the apparatus, the operator's platform overlying the table not shown.
Figure 6:
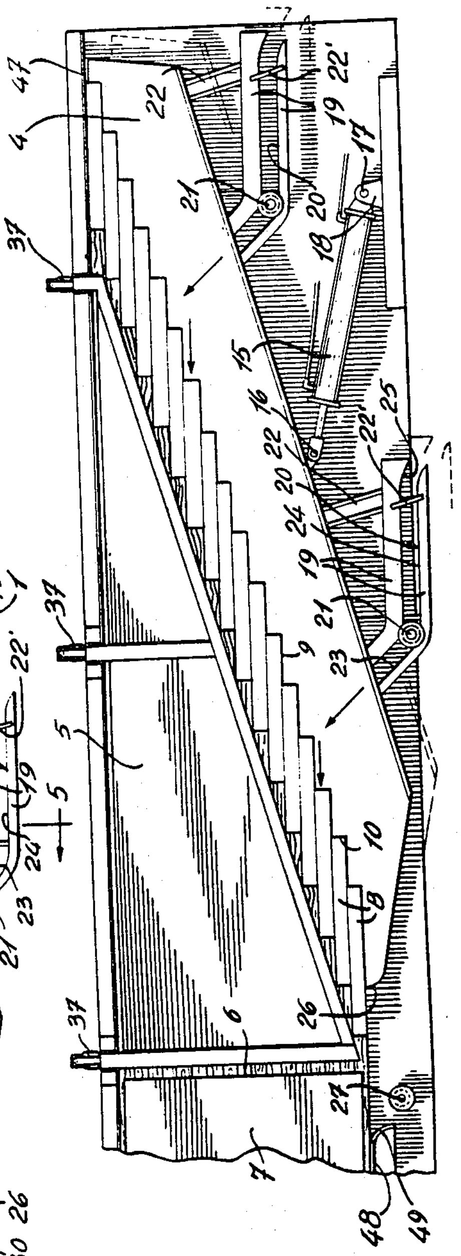
FIG. 6, shown on the first page of the drawings, is a plan view corresponding to that of FIG. 1 but showing the ram member in approximately the mid-portion of its reciprocating movement.

In the drawings, like reference characters indicate like elements throughout.

The apparatus of the invention comprises an elongated table 1 having a rear portion 2 and a front portion 3 relative to the direction of movement of the solid wood-laminated continuous panel A being made by the apparatus and consisting of elongated wood blocks B, of uniform size and glued together. As shown in FIG. 1, the rear portion 2 of the horizontal table carries a ram member 4 and a triangular pressing plate 5, which has a front transverse edge 6. The front portion of the table carries over the same a glue-curing and pressing plate 7 having its rear edge terminated at the edge 6 of plate 5. Plate 7 is disposed in alignment with a forwardly of pressing plate 5.

A braking plate 8 is arranged forwardly of the glue-curing plate 7 and in alignment therewith.

Ram member 4 is in the form of an elongated beam having a stepped forward edge 9 defined by a plurality of successive steps 10 extending transversely of the table and each equally spaced from the other longitudinally of the table, the imaginary line passing through the outer corners of each step 10 is straight and is inclined with respect to the table.

The ram member 4 has an L-shaped cross-section, as shown in FIG. 7, and is reinforced at its rear upstanding flange by a strip 11 while its horizontal flange is reinforced and made thicker by strips 12 and plate 13. The ram member slides on the table 1 in a reciprocating movement, being actuated by a double-acting hydraulic cylinder piston unit 15 pivotally connected at 16 to the rear edge of the ram member and at 17 to a bracket 18 fixed to the table. During this reciprocating movement, the ram member is maintained parallel to itself and is guided in a predetermined path by means of at least two angular guide members 18 fixed to the ram member and extending rearwardly of the same; each guide member has a central angular slot 20 engaging a freely rotatable guide wheel 21, the shaft of which is secured to the top of table 1. The angular guides 19 are fixed at their free ends to reinforcing bars 22 and overlying bridging bars 22'. Bars 22 are fixed to the ram member 4. Each slot 20 has a forward portion 23 which is inclined with respect to the length of the table at about 30° while each slot 20 has a rear portion 24 which is parallel to the longitudinal axis of the table 1. The outermost rear end portion 25 of the guiding slot 20 is curved to extend at a slight angle with respect to the long axis of the table 4. The forward end of the ram table forms a finger having a rounded end 26, which is engageable with a guide wheel 27 appropriately located and carried by the top of the table.

In the retracted position of the ram member 4, as shown in FIG. 1, its stepped edge 9 is rearwardly spaced from the inclined rear edge 28 of triangular pressing plate 5; this space defines a feeding station for the solid wooden blocks B.

As shown in FIGS. 5, 7, and 8, there is disposed over said feeding station a stacking rack assembly, generally indicated at 29, for holding a plurality of stacks of elongated solid wood blocks B. The rack assembly 29 consists of upright angle irons 30 properly secured one to another and defining as many compartments as there are stacks of blocks B. These uprights are carried by beams 31, as shown in FIG. 5, in turn secured to an operator's platform 32 overlying the ram member in its retracted position. Said operating platform 32 may be suspended from the room in which the device is located and is preferably provided with a handrail 33. As clearly shown in FIG. 7, the lower end of the angle irons 30 of the rack is spaced upwardly from the table 1 a distance slightly greater than the thickness of the wooden blocks B; so, upon forward movement of the ram member 4 from its retracted position, as shown in FIG. 5, the lowermost blocks B of each stack will be engaged by the ram member and pushed laterally away from the rack assembly 29, as shown in FIG. 7, while the next lowermost series of blocks will rest on the ram member 4. Each rack of the rack assembly 29 holds a stack of blocks B in longitudinal alignment with the table and in staggered position one with respect to the other, so as to conform with the longitudinal spacing of the steps 10 of the operating edge of the ram member 4.

Because the ram member 4 remains parallel to itself during its reciprocating movement, the stepped edge 9 of the ram member 4 remains substantially parallel to the inclined edge 28 of pressing plate 5. As shown in FIG. 5, the pressing plate 5 is mounted for pivoting movement to uncover the portion of the table underneath the same. More particularly, it is pivotally carried at 34 to the ends of arms 35 which are pivoted intermediate their ends on brackets 36 carried by the table 1. The outer ends of the arms 35 are power-actuated by means of double-acting hydraulic cylinder and piston units 37 pivotally attached to said arms and to brackets 38 carried by the frame work 40 of the table 1. The hydraulic cylinder and piston units 37 serve also to press the pressing plate 5 against assembled wooden blocks B lying underneath and slidably supported by table 1.

Figure 2:
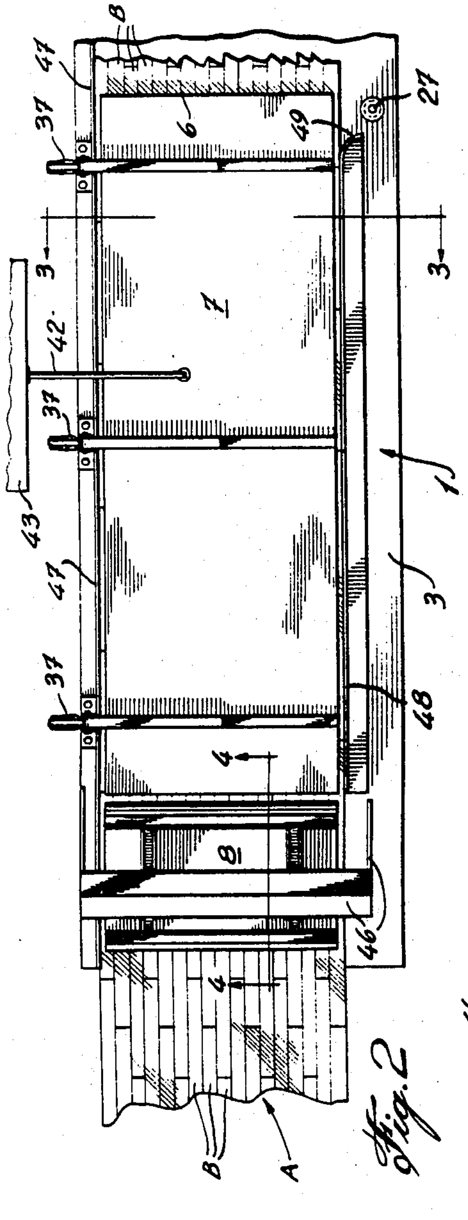
FIG. 2, found on the second page of the drawings, is a top plan view of the front portion of the apparatus.
Figure 3:
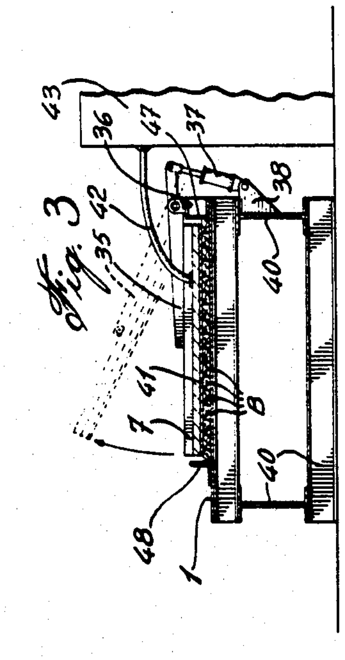
FIG. 3 is a cross-section taken along line 3—3 of FIG. 2.
Figure 4:
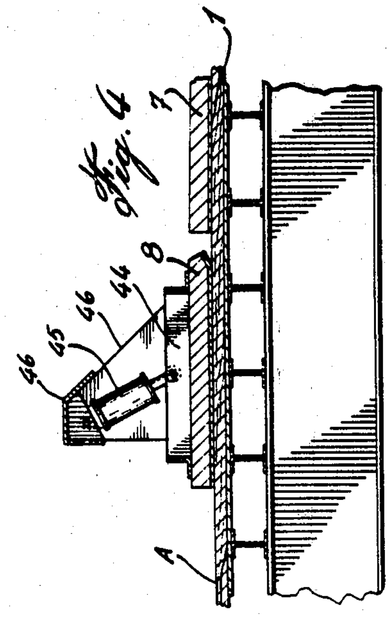
FIG. 4 is a cross-section taken along line 4—4 of FIG. 2.

Similarly, the glue-curing plate 7, shown in FIG. 2 and also in cross-section in FIG. 3, is mounted for swinging movement so as to uncover the table portion lying underneath the same. The same arrangement of arms 35, brackets 36 and double-acting hydraulic cylinder and piston units 37 pivotally carried by brackets 38 are arranged for the glue-curing plate 7. The same can be applied with pressure against the wooden blocks underlying the same. The glue-curing plate 7 is provided with a flat electrode 41 coextensive with said plate 7 and fed with high-frequency electricity by means of a cable 42 connected to a high-frequency generator, generally indicated at 43 and of known construction. The braking plate 8, shown in FIGS. 2 and 4, also overlies the table and is secured to a frame 44 connected to double-acting hydraulic cylinder and piston units 45, which are in turn pivotally connected to a support 46 carried by the table 1. Cylinder units 45 can raise and lower the braking plate 8 to press the same against the assembled wooden panel, so as to exert a braking force resisting the forward movement of the panel under the forward pressure exerted by the ram member 4. The table 1 is provided along its longitudinal edge opposite to the ram member 4 with a guiding and abutment shoulder 47 upstanding therefrom, said shoulder 47 being shown in FIGS. 1, 2, 5, and 6. Downstream from guiding roller 27 on the same side as the ram member, there is also provided a guide member 48 extending longitudinally of the table and having a rounded end 49 adjacent the guide roller 27.

The machine operates as follows:

the solid wood blocks B to be used all have the same thickness and length and continuously placed in the rack assembly 29 by the operator standing on platform 32 during operation of the apparatus. These blocks are pre-coated, at least along two right angle edges, with a thermo-setting glue, such as urea glue. At the first forward stroke of the ram member 4, the lowermost wooden blocks B of the stacks in the rack assembly 29 and resting on the table 1 are first pushed diagonally and forwardly and then forwardly along the table and are inserted under pressing plate 5 in the position shown in FIG. 1, wherein it is seen that their trailing ends protrude from edge 28 of pressing table 5. Upon each successive forward stroke of ram member 4, a new group of blocks B is fed under plate 5, so as to press their longitudinal and forward edges against the corresponding edges of the already-laid wooden blocks. Thus, the blocks are pressed together transversely of the table and eventually against the shoulder 47 on the opposite side of the table after the panel being assembled has attained its full width. When the ram member accomplishes its second forward stroke portion longitudinally of the table with the guide wheels 1 then engaging the straight portion 24 of the guide slots 20, the new group of wooden blocks pushes the previously-assembled blocks on the table 1 against the resistance produced by pressing plate 5 and eventually by the glue-curing plate 7 and, finally, by the braking plate 8. At the end of the forward stroke of the ram member, its rounded end 26 engages the guide wheel 27 while the guide wheels 21 engage the outer ends 25 of the guide slots 20, whereby the ram member is again moved transversely of the table to effect a final transverse pressure on the blocks against shoulder 47. Once the assembled blocks reach underneath the glue-curing plate 7, the glue is cured by the high-frequency electric field produced between electrode 41 and steel table 1. The assembled blocks move step by step at each forward stroke of the ram member.

The braking member 8 exerts its braking force during the last two-thirds of the forward longitudinal stroke of the ram member. The end of the forward stroke of the ram member initiates the high-frequency generator to start the glue-curing cycle. Completion of the cycle initiates the backward stroke and the succeeding forward stroke of ram member 4. The assembled moving blocks B move step by step through the apparatus and the final laminated panel A is of continuous length and the glue is completely cured. Because of the lateral pressure exerted on the assembled blocks by the ram member and the longitudinal compression exerted by the ram member and the braking device 8, the longitudinal and transverse joints in panel 8 have a close and smooth fit. A cross saw may be installed close to the discharge end of the machine to cut off the bvelled leading end of the panel and to cut the latter into desired lengths.

In the finished panel A, the blocks B are longitudinally aligned with respect to the machine in several longitudinal rows, and the blocks B of each row are longitudinally offset with respect to the blocks of an adjacent row, prefably by about ⅓ of the length of an individual block.

What we claim is:

1. A method of obtaining a continuous laminated panel made of individual solid wood blocks glued together, arranged in longitudinal rows and offset from row to row transversely of the panel, said method comprising the steps of successively positioning groups of such blocks glue coated along at least two adjacent edges at a feeding station at the rear end portion of an elongated table, the blocks of each group disposed side by side in a number equal to the number of said longitudinal rows and each aligned longitudinally of said table, the blocks of each group offset one from the other longitudinally of the table, successively pushing each group of so-positioned blocks along said table transversely and forwardly of said table to abut the blocks of a succeeding group against the blocks of a preceding group, said pushing step being effected on a given group of blocks while the preceding groups of blocks are positively retained against movement transversely of said table and while they are braked in their forward movement longitudinally of said table, to press the blocks together and to form close joints between the blocks, and heat curing the glue of the assembled and pressed blocks.

2. A method as claimed in claim 1, wherein the step of successively positioning groups of such blocks at said feeding station comprises stacking said blocks in upright racks disposed above said table at said feeding station, said pushing step including removing the lowermost block from under each stack.

3. A method as claimed in claim 1, wherein said pushing step is accomplished in two successive motions with the first motion in a direction transversely and forwardly of the table and the second motion in a direction solely forwardly longitudinally of the table.

4. A method as claimed in claim 3, wherein the blocks of each group are all of uniform size and are elongated, being disposed lengthwise longitudinally of said table during said positioning step.

5. A method as claimed in claim 1, wherein the glue coating said blocks is a thermo-setting resin and curing of said glue includes applying to said panel a high frequency electromagnetic field to heat said glue.

6. A method as claimed in claim 5, wherein curing of said glue by means of said high-frequency electromagnetic field starts at the termination of said pushing step.

7. A method as claimed in claim 6, further including applying an increased resistance to the forward movement of the blocks during the last portion of the pushing step.

8. An apparatus for making a continuous wood-laminated panel from separate wooden blocks, of uniform size and glue coated along at least two adjacent edges, said apparatus comprising an elongated table, a ram member disposed over one end portion of said table and having a stepped pushing edge with each step arranged transversely of said table, power means for reciprocating said ram member to effect a forward pushing stroke and a backward retracting stroke, guide means for guiding said ram member during its forward and retracting strokes to maintain said ram member parallel to itself and to cause movement of said ram member transversely and forwardly of the table during its forward stroke, said table having a longitudinal abutment shoulder along its edge opposite the ram member, pressing overlying said table to press against said table the blocks successively pushed by said ram member underneath said pressing plates, one of said pressing plates having means to cure the glue.

9. An apparatus as claimed in claim 8, wherein said guide means include a first guide means section causing said ram member to move transversely and forwardly of said table during a first portion of said forward stroke and a second guide means section causing said ram member to move solely longitudinally of said table during a second portion of said forward stroke.

10. An apparatus as claimed in claim 9, further including means for successively positioning individual elongated wooden blocks precoated with glue along two adjacent edges onto said table in longitudinal alignment therewith and in longitudinally-offset position opposite each step of said ram member in the retracted position of the latter.

11. An apparatus as claimed in claim 10, wherein said last-named means includes stacking racks disposed over said table and each adapted to hold an individual stack of said wooden blocks precoated with glue, said ram member, during its forward stroke, pushing the lowermost block of each stack from underneath said stack.

12. An apparatus as claimed in claim 11, wherein said pressing plates include a first pressing plate positioned over said one end portion of said table and having a free edge substantially parallel to the stepped edge of said ram member, the forward stroke of said ram member pushing the lowermost blocks of each stack underneath said first pressing plate and power means moving said pressing plate downwardly towards said table to press the blocks inserted under said first pressing plate against said table.

13. An apparatus as claimed in claim 12, further including a second pressing plate disposed over said table side by side with said first pressing plate forwardly of the same and, in alignment therewith, means to move said second pressing plate downwardly towards said table to press against assembled wooden blocks disposed between said table and said second pressing plate, said second plate carrying said means to cure the glue.

14. An apparatus as claimed in claim 13, wherein said first and second pressing plates are pivoted along the opposite longitudinal edge of said elongated table to uncover said table.

15. An apparatus as claimed in claim 14, further including a third pressing plate disposed over said table at the forward end thereof, side by side and in alignment with said second pressing plate, power means pushing said third pressing plate towards said table to press the blocks against said table, said third plate effecting braking pressure on the panel during the last part of the forward stroke of said ram member.

16. An apparatus as claimed in claim 15, including additional guide means associated with said table and engaging said ram member at the end of its forward stroke to cause the same to move transversely of said table and effect a final pressure on said wooden block transversely of said table and against said abutment shoulder.

17. An apparatus as claimed in claim 15, wherein said steps of said ram member are equally spaced longitudinally of said table.

* * * * *